No. 689,091. Patented Dec. 17, 1901.
A. L. JONES.
PIPE FOR SEWERS, &c.
(Application filed Dec. 10, 1900.)
(No Model.)
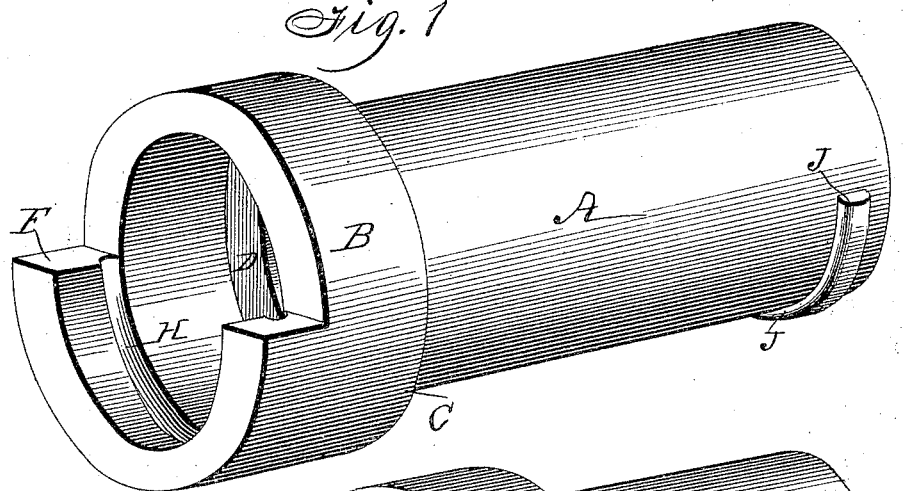
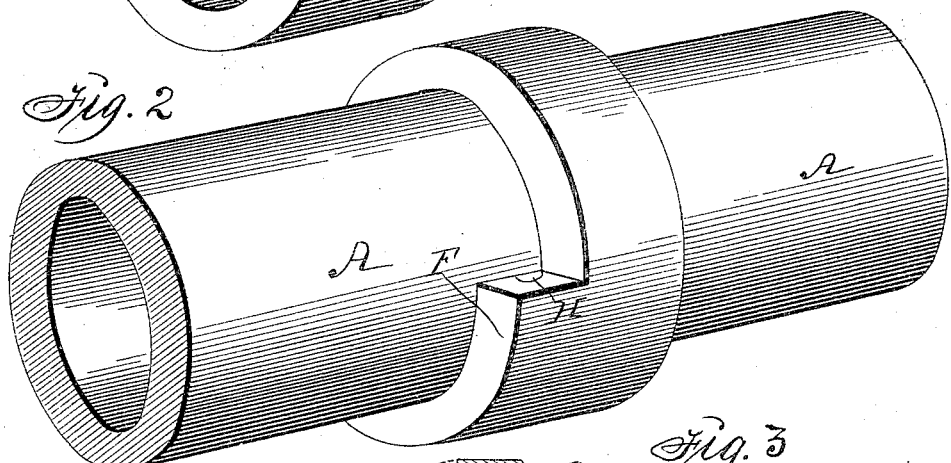
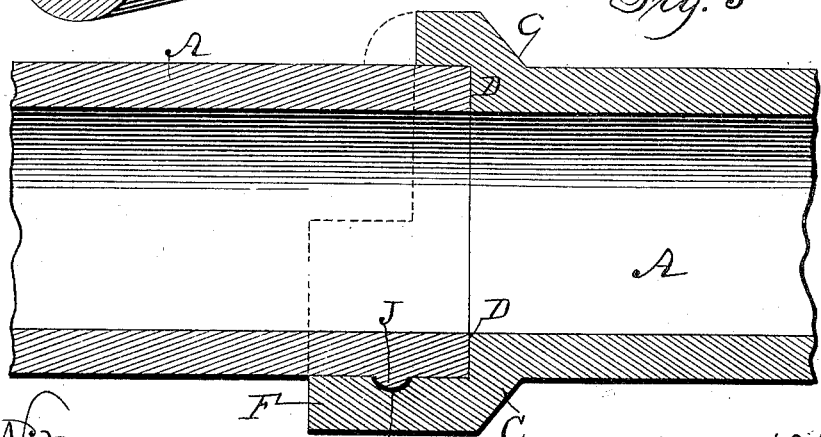
Witnesses:
R. S. Orwig.
F. C. Stuart.
Inventor: Abraham L. Jones
By Thomas C. Orwig, Attorney.

UNITED STATES PATENT OFFICE.

ABRAHAM LINCOLN JONES, OF CANTON, SOUTH DAKOTA, ASSIGNOR TO HIMSELF, AND J. G. LAXSON, OF LINCOLN COUNTY, SOUTH DAKOTA.

PIPE FOR SEWERS, &c.

SPECIFICATION forming part of Letters Patent No. 689,091, dated December 17, 1901.

Application filed December 10, 1900. Serial No. 39,282. (No model.)

*To all whom it may concern:*

Be it known that I, ABRAHAM LINCOLN JONES, a citizen of the United States, residing at Canton, in the county of Lincoln and State of South Dakota, have invented a new and useful Pipe for Sewers, of which the following is a specification.

Heretofore pipes made of clay, concrete, and metal have had an enlarged diameter and annular shoulders on the inside and outside at one end of the pipe, so that the straight and plain end of another piece could be inserted in the enlarged end and cement or molten lead placed around the pipes to make a water-tight joint. Pipes thus formed and connected for conveying sewage, water, or any other kind of fluid matter when the ground settles under them are liable to sag and in bending downward at the joints to break the cement and to separate to some degree, so as to cause leakage between the overlying or telescopic parts. Semicircular extensions have also been formed on the enlarged ends of pipes, so the end of a pipe of smaller dimensions could be by vertical motion placed on the inside surface of the semicircular extension and a water-tight joint produced between the two ends by means of packing and cement; but in no instance has a semicircular extension of the enlarged end of a pipe been provided with a groove on its inside face and the small end of the pipe provided with an integral bead adapted to enter the groove in the enlarged extension of another like piece of pipe to prevent any longitudinal movement between the overlying parts and to aid in producing a water-tight and durable joint as contemplated by my invention.

My object is to facilitate the labor required in connecting pieces of pipe and to prevent the breaking, leaking, and damages incident to the sagging and separating of continuous pipes at the points where they are coupled together to produce water-tight joints; and my invention consists in the construction and combination of mating pieces of pipe, as hereinafter set forth, pointed out in my claims, and illustrated in the accompanying drawings, in which—

Figure 1 is a perspective view of a short section of pipe that may be made of clay or any other suitable material and vary in length, diameter, and weight as desired. Fig. 2 shows two mating pieces connected and in position as required to prevent deflection from a straight line, as occurs when there is sagging, separation, and impairment of a joint in a line of pipe. Fig. 3 is a longitudinal central sectional view of the joint shown in Fig. 2. Dotted lines indicate where cement is applied, so that it will be visible on the exterior and where it will not be broken by sagging of a pipe and remain intact, as required to maintain a water-tight and steam-tight joint.

The letter A designates the central body portion of a piece or complete section of my pipe.

B is the end that has an enlarged diameter, an annular shoulder C on its exterior, and an annular shoulder D at the inner end of the bore of enlarged diameter.

F is an integral semicircular extension of the part B, and H is a groove in the inside face and rear end of the extension adapted to admit a corresponding bead on the straight end of a mating length or section of pipe, as shown in Fig. 3.

J is an integral bead on the small and straight end of the section so located relative to the extension F and the groove H that when two sections are connected to produce a joint the end face of the straight end will abut against the annular shoulder D at the inner end of the enlarged diameter and the bead J will be in the groove F, so that the pieces will be practically interlocked, as required to prevent longitudinal movements relative to each other to prevent sagging at a joint, breakage, and leakage.

In laying pipes and connecting sections it is obvious that when one piece or section is in proper position the straight and small end of a mating section when the bead J is on top can be first readily placed upon the end portion of the semicircular extension F and then moved longitudinally and into the bore of enlarged diameter and then by rotating it a half-revolution cause the bead J to enter the groove H. Strong and durable joints thus readily produced can very quickly be made water-tight and steam-tight by applying suitable cement or metal on top of the straight and small end and against the face of the large end, as indicated by dotted lines in Fig. 3.

Having thus described the purpose and construction of my invention, its practical utility will be readily understood by persons familiar with the art to which it pertains, and what I claim as new, and desire to secure by Letters Patent, is—

1. A section of pipe having an enlarged diameter at one end, an annular shoulder at the inner end of the enlarged bore, a semicircular extension at the end of the enlarged portion, a groove in the inside face of said extension and a bead on the exterior of the small and straight end of the same pipe, for the purposes stated.

2. In a pipe composed of mating sections, a joint consisting of a section having an extension of enlarged diameter at one end, a semicircular extension of the enlarged portion and a groove in the inside face of said semicircular extension and a pipe-section having a straight end fitted in the bore of said enlarged diameter and provided with an integral bead on its outer surface adapted to enter said groove in the semicircular extension, arranged and combined in the manner set forth for the purposes stated.

ABRAHAM LINCOLN JONES.

Witnesses:
 THOMAS G. ORWIG,
 M. P. COAKLEY.